US009974079B1

(12) United States Patent
Gayde et al.

(10) Patent No.: US 9,974,079 B1
(45) Date of Patent: May 15, 2018

(54) FREQUENCY SELECTION FOR BROADBAND TRANSMISSIONS AMONG A SHARED SPECTRUM

(71) Applicant: NOKIA SOLUTIONS AND NETWORKS OY, Espoo (FI)

(72) Inventors: William Gayde, Naperville, IL (US); Akila Srinivasan, Carpentersville, IL (US); Tarun Agarwal, Palatine, IL (US); Alex Hirsbrunner, Bloomingdale, IL (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days. days.

(21) Appl. No.: 15/346,536

(22) Filed: Nov. 8, 2016

(51) Int. Cl.
| | |
|---|---|
| *H04W 72/00* | (2009.01) |
| *H04W 72/04* | (2009.01) |
| *H04W 72/14* | (2009.01) |
| *H04W 24/08* | (2009.01) |
| *H04B 17/318* | (2015.01) |

(52) U.S. Cl.
CPC ...... *H04W 72/0453* (2013.01); *H04B 17/318* (2015.01); *H04W 24/08* (2013.01); *H04W 72/14* (2013.01)

(58) Field of Classification Search
CPC . H04W 72/0453; H04W 72/14; H04W 24/08; H04B 17/318
USPC ................................... 455/452.2, 452.1, 450
See application file for complete search history.

(56) References Cited

U.S. PATENT DOCUMENTS

| | | | | |
|---|---|---|---|---|
| 2008/0132173 | A1* | 6/2008 | Sung ..................... | H04L 1/0019 455/67.13 |
| 2012/0322488 | A1* | 12/2012 | Johansson ............. | H04W 16/10 455/513 |
| 2014/0237547 | A1* | 8/2014 | Bose ................... | H04W 52/367 726/3 |
| 2016/0119951 | A1* | 4/2016 | Mallik ................... | H04L 5/001 370/329 |
| 2016/0212624 | A1 | 7/2016 | Mueck et al. | |
| 2016/0249224 | A1* | 8/2016 | Prasad .................. | H04W 16/14 |
| 2016/0330743 | A1* | 11/2016 | Das ....................... | H04L 67/142 |

OTHER PUBLICATIONS

European Search Report dated Mar. 14, 2018 corresponding to European Patent Application No. 17195596.6.
(Continued)

*Primary Examiner* — Khai M Nguyen
(74) *Attorney, Agent, or Firm* — Squire Patton Boggs (US) LLP

(57) ABSTRACT

Various communication systems may benefit from improved radio frequency transmissions. For example, communication systems may benefit from the selection of a frequency band based on measurements of a spectrum surrounding the user equipment. A method, in certain embodiments, may include taking measurements by a base station of a spectrum of an environment surrounding a user equipment. The method may also include determining based on the measurements and radio frequency capabilities of the base station at least one desired frequency for transmission by the user equipment. In addition, the method may include sending a request from the base station to a network entity requesting a grant of the at least one desired frequency for transmission by the user equipment.

26 Claims, 7 Drawing Sheets

(56) References Cited

OTHER PUBLICATIONS

Federated Wireless, "CBRS Spectrum Sharing Model in US," 3GPP Draft; RP-1511514, 3GPP TSG RAN Meeting #69, Phoenix, Arizona, Sep. 15, 2015, XP051000969.
Ericsson, "Discussion on 3.5GHz in the US," 3GPP Draft; R4-155294, TSG-RAN Working Group 4 (Radio) meeting #76, Beijing, China, Aug. 24-28, 2015, XP051027140.
Nokia Networks, "FCC's rules related to 3.5GHz spectrum usage in USA," 3GPP Draft; R4-153527, TSG-RAN Working Group 4 (Radio) meeting #75, Fukuoka, Japan, May 25-29, 2015, XP050969337.

* cited by examiner

US 9,974,079 B1

FREQUENCY SELECTION FOR BROADBAND TRANSMISSIONS AMONG A SHARED SPECTRUM

BACKGROUND

Field

Various communication systems may benefit from improved radio frequency transmissions. For example, communication systems may benefit from the selection of a frequency band based on measurements of a spectrum of an environment surrounding a user equipment.

Description of the Related Art

The Federal Communications Commission (FCC) has adopted rules to allow for shared commercial use of 150 megahertz (MHz) of spectrum in a band ranging from 3550-3700 MHz. In certain embodiments, such a band is known as the 3.5 GHz band. The 3.5 GHz unlicensed spectrum can be made available to a wide variety of users and deployment models.

In order to facilitate the spectrum sharing process of the 3.5 GHz band, a Access System ("SAS") is used to assign frequencies. SAS is a highly automated frequency coordinator that authorizes and manages use of the Citizens Band Radio Service (CBRS) spectrum, protects higher tier operations from interference, and maximizes frequency capacity for all CBRS operators.

Prior to beginning radio transmission on the 3.5 GHz unlicensed spectrum, a Citizens Band Service Device (CBSD) may have indicated whether it can supply measurements of its environment. CBSDs may be specific transmission equipment with standardized capabilities that are employed by CBRS operators for use in the 3.5 GHz band. There are two types of CBDSs: Category A, which are a lower powered CBSD, and Category B, which are higher powered CBSD. Before beginning radio frequency transmissions, CBSD sends a request to SAS for a spectrum grant so that it may broadcast in the spectrum.

SUMMARY

A method, in certain embodiments, may include taking measurements by a base station of a spectrum of an environment surrounding a user equipment. The method may also include determining based on the measurements and radio frequency capabilities of the base station at least one desired frequency for transmission by the user equipment. In addition, the method may include sending a request from the base station to a network entity requesting a grant of the at least one desired frequency for transmission by the user equipment.

According to certain embodiments, an apparatus may include at least one memory including computer program code, and at least one processor. The at least one memory and the computer program code may be configured, with the at least one processor, to cause the apparatus at least to take measurements by a base station of a spectrum of an environment surrounding a user equipment. The at least one memory and the computer program code may also be configured, with the at least one processor, at least to determine based on the measurements and radio frequency capabilities of the base station at least one desired frequency for transmission by the user equipment. In addition, the at least one memory and the computer program code may also be configured, with the at least one processor, at least to send a request from the base station to a network entity requesting a grant of the at least one desired frequency for transmission by the user equipment.

An apparatus, in certain embodiments, may include means for taking measurements by a base station of a spectrum of an environment surrounding a user equipment. The apparatus may also include means for determining based on the measurements and radio frequency capabilities of the base station at least one desired frequency for transmission by the user equipment. In addition, the apparatus may include means for sending a request from the base station to a network entity requesting a grant of the at least one desired frequency for transmission by the user equipment.

According to certain embodiments, a non-transitory computer-readable medium encoding instructions that, when executed in hardware, perform a process. The process may include taking measurements by a base station of a spectrum of an environment surrounding the user equipment. The process may also include determining based on the measurements and radio frequency capabilities of the base station at least one desired frequency for transmission by the user equipment. In addition, the process may include sending a request from the base station to a network entity requesting a grant of the at least one desired frequency for transmission by the user equipment.

According to certain embodiments, a computer program product encoding instructions for taking measurements by a base station of a spectrum of an environment surrounding the user equipment. The method may also include determining based on the measurements and radio frequency capabilities of the base station at least one desired frequency for transmission by the user equipment. In addition, the method includes sending a request from the base station to a network entity requesting a grant of the at least one desired frequency for transmission by the user equipment.

A method, in certain embodiments, may include receiving from a user equipment or a base station at a network entity a request for a grant of at least one desired frequency for transmission by the user equipment. The method may also include determining whether the request for the at least one desired frequency is granted to the user equipment. In addition, the method may include sending to the base station or the user equipment the grant of the at least one desired frequency for transmission.

According to certain embodiments, an apparatus may include at least one memory including computer program code, and at least one processor. The at least one memory and the computer program code may be configured, with the at least one processor, to cause the apparatus at least to receive from a user equipment or a base station at a network entity a request for a grant of at least one desired frequency for transmission by the user equipment. The at least one memory and the computer program code may also be configured, with the at least one processor, at least to determine whether the request for the at least one desired frequency is granted to the user equipment. In addition, the at least one memory and the computer program code may be configured, with the at least one processor, at least to send to the base station or the user equipment the grant of the at least one desired frequency for transmission.

An apparatus, in certain embodiments, may include means for receiving from a base station or a user equipment at a network entity a request for a grant of at least one desired frequency for transmission by the user equipment. The apparatus may also include means for determining whether the request for the at least one desired frequency is granted to the user equipment. In addition, the apparatus may include means for sending to the base station or the user equipment the grant of the at least one desired frequency for transmission.

According to certain embodiments, a non-transitory computer-readable medium encoding instructions that, when executed in hardware, perform a process. The process may include receiving from a user equipment or a base station at a network entity a request for a grant of at least one desired frequency for transmission by the user equipment. The process may also include determining whether the request for the at least one desired frequency is granted to the user equipment. In addition, the process may include sending to the user equipment or the base station the grant of the at least one desired frequency for transmission.

According to certain embodiments, a computer program product encoding instructions for performing a process according to a method including receiving from a user equipment or a base station at a network entity a request for a grant of at least one desired frequency for transmission by the user equipment. The method may also include determining whether the request for the at least one desired frequency is granted to the user equipment. In addition, the method may include sending to the base station or the user equipment the grant of the at least one desired frequency for transmission.

A method, in certain embodiments, may include taking measurements by a user equipment of a spectrum of an environment surrounding the user equipment. The method may also include determining based on the measurements and radio frequency capabilities of the user equipment at least one desired frequency for transmission by the user equipment. In addition, the method may include sending a request from the user equipment to the base station requesting a grant of the at least one desired frequency for transmission by the user equipment. The request is forwarded to a network entity through the base station.

According to certain embodiments, an apparatus may include at least one memory including computer program code, and at least one processor. The at least one memory and the computer program code may be configured, with the at least one processor, to cause the apparatus at least to take measurements by a user equipment of a spectrum of an environment surrounding the user equipment. The at least one memory and the computer program code may also be configured, with the at least one processor, at least to determine based on the measurements and radio frequency capabilities of the user equipment at least one desired frequency for transmission by the user equipment. In addition, the at least one memory and the computer program code may be configured, with the at least one processor, at least to send a request from the user equipment to the base station requesting a grant of the at least one desired frequency for transmission by the user equipment. The request is forwarded to a network entity through the base station.

An apparatus, in certain embodiments, may include means for taking measurements by a user equipment of a spectrum of an environment surrounding the user equipment. The apparatus may also include means for determining based on the measurements and radio frequency capabilities of the user equipment at least one desired frequency for transmission by the user equipment. In addition, the apparatus may include means for sending a request from the user equipment to the base station requesting a grant of the at least one desired frequency for transmission by the user equipment. The request is forwarded to a network entity through the base station.

According to certain embodiments, a non-transitory computer-readable medium encoding instructions that, when executed in hardware, perform a process. The process may include taking measurements by a user equipment of a spectrum of an environment surrounding the user equipment. The process may also include determining based on the measurements and radio frequency capabilities of the user equipment at least one desired frequency for transmission by the user equipment. In addition, the process may include sending a request from the user equipment to the base station requesting a grant of the at least one desired frequency for transmission by the user equipment. The request is forwarded to a network entity through the base station.

According to certain embodiments, a computer program product encoding instructions for performing a process according to a method including taking measurements by a user equipment of a spectrum of an environment surrounding the user equipment. The method may also include determining based on the measurements and radio frequency capabilities of the user equipment at least one desired frequency for transmission by the user equipment. In addition, the method may include sending a request from the user equipment to the base station requesting a grant of the at least one desired frequency for transmission by the user equipment. The request is forwarded to a network entity through the base station.

BRIEF DESCRIPTION OF THE DRAWINGS

For proper understanding of the invention, reference should be made to the accompanying drawings, wherein.

DETAILED DESCRIPTION

Figure 1:
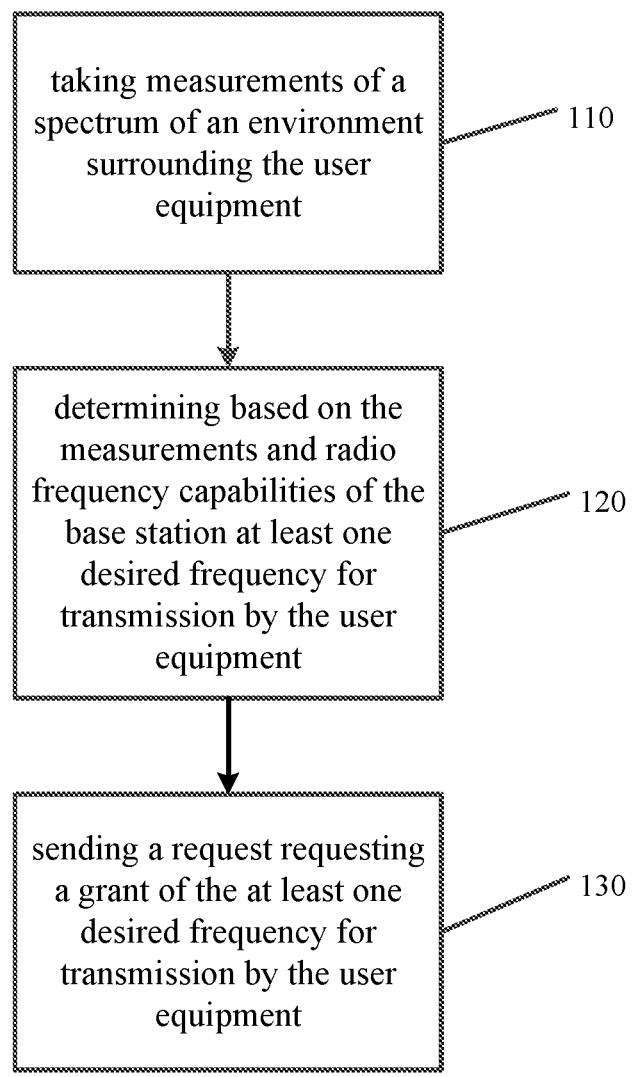
FIG. 1 illustrates a flow diagram according to certain embodiments.

The bandwidth of the available 3.5 GHz unlicensed spectrum may be wider than the bandwidth of the user equipment or device using the unlicensed spectrum. Therefore, a selection may be made of the best frequency in the spectrum for use by a particular user equipment or device. Certain embodiments may help to facilitate the selection of this desired frequency in an unlicensed shared access system. The use of the desired frequency by the user equipment or device may allow for the optimal selection of frequency, resulting in a maximum throughput of transmissions by the user equipment. Once an optimal selection of the desired frequency is made, the user equipment may request that a network entity in an unlicensed shared access system, such as SAS, grant or assign the desired frequency to the user equipment or device.

In order to select the desired frequency for transmission, a user equipment, such as a user equipment device, or a base station, such as a CBSD, may have the ability to take measurements of the spectrum of an environment surrounding the user equipment. In certain embodiments, the base station may take initial measurements, while the user equipment may take subsequent measurements. For example, the measurements may be reported using a Received Signal Strength Indicator (RSSI). Using the measurement data, the user equipment or the base station may, in some embodiments, automatically determine the best portion of the spectrum that matches the configured bandwidth of the user equipment or device, or which optimizes a transmission throughput of the user equipment or device.

In certain embodiments, the user equipment or device and the base station may be used to provide Time Division Duplex (TDD) Long Term Evolution (LTE) services. In such an LTE embodiment, the transmission frequency of the user equipment may be predefmed or initially limited to between 3550 MHz and 3570 MHz of the 3.5 GHz unlicensed band. In other embodiments, the user equipment may be predefined or initially limited to a different range of the 3.5 GHz unlicensed band. Once the desired frequency is determined by the base station or the user equipment, the request can be sent to a network entity in the SAS. The request may include information relating to the desired frequency and/or information relating to the desired transmission peak power that will be used by the user equipment. Any of the embodiments discussed herein may be used for any other frequencies and/or for any other technology other than LTE.

The SAS, in some embodiments, can impose further restrictions on the desired frequency of the user equipment. The restrictions, for example, may relate to the location of the user equipment. The restrictions may also relate to a subset of data channels that are subject to frequency suspension by the SAS during normal operations. The SAS may therefore restrict the user equipment from using such subsets to avoid the use of data channels that are frequently suspended.

In certain embodiments, a Candidate Frequency Selection Function (CFSF) may be used by the user equipment or base station to help determine the desired frequency. The CFSF may be implemented in the user equipment or base station using at least one processor and at least one memory including computer program code. The CFSF may utilize technique which can input raw measurement data, for example RSSI, and output one or more desired frequencies for transmission based on the radio frequency capabilities of the user equipment. For example, the CFSF may in some embodiments compare 15 individual measurements, each measurement being 10 MHz. In other embodiments, any other bandwidth may be used. The measurements may span the entire 150 MHz band of the 3.5 GHz unlicensed spectrum in order to compute the best one or more frequencies for the operation of the user equipment or device.

Figure 2:
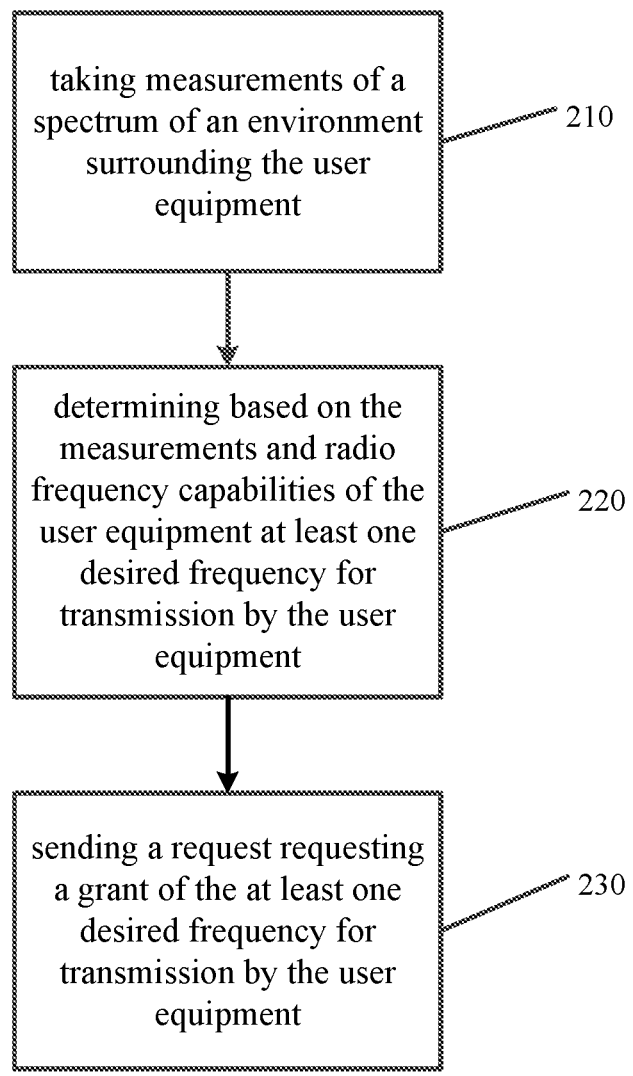
FIG. 2 illustrates a flow diagram according to certain embodiments.
Figure 3:
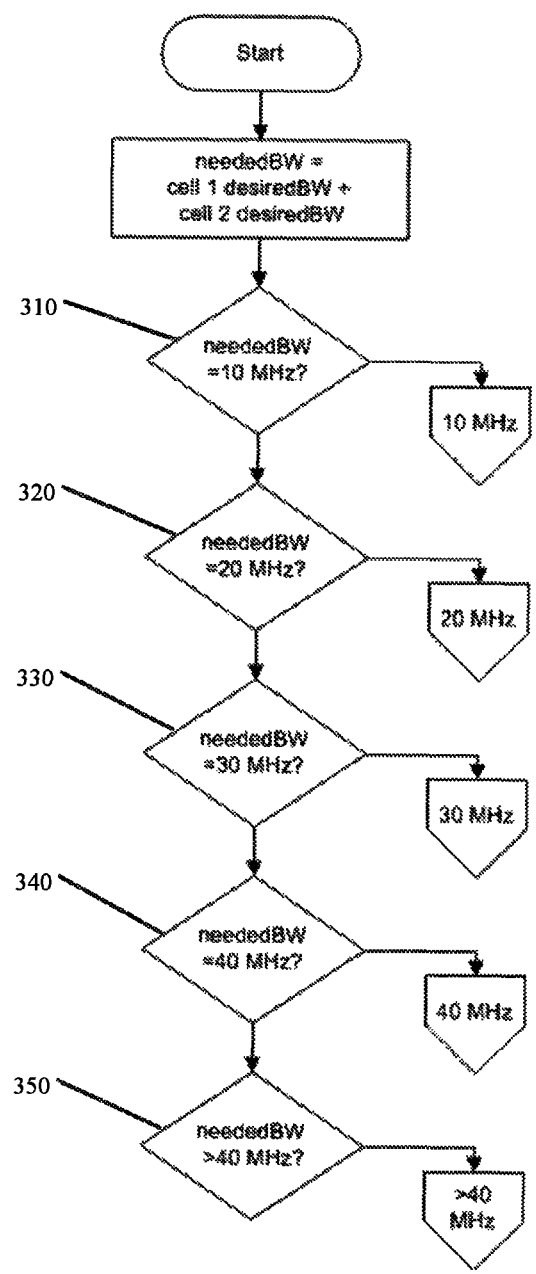
FIG. 3 illustrates a flow diagram according to certain embodiments.

The technique, for example, may use a unique sequence of calculations, as shown in FIGS. 2 and 3, which can account for peak RSSIs, the median of the average RSSIs, and/or the lowest RSSI in predicting the frequencies producing the highest level of performance. The technique may also account for accommodating radio transmission schemes having contiguous bandwidth, such as carrier aggregation. The technique may then compute one or more frequencies within 150 MHz unlicensed spectrum band which meets the radio frequency capabilities of the user equipment, as well as achieve the highest level of performance.

FIG. 1 illustrates a flow diagram according to certain embodiments. In particular, FIG. 1 illustrates an embodiment of a base station, such as a CBSD. In step 110, the base station, for example a CBSD, can take measurement of a spectrum of an environment surrounding the user equipment. The base station may take initial measurements when the user equipment registers or joins the network. The UE may then supplement or take measurements instead of the base station at a later point in time. In other words, the measurements may be of the radio frequency environment surrounding the user equipment. The entire 3.5 GHz unlicensed spectrum is 150 MHz wide, and stretches from 3550 MHZ to 3700 MHz. In embodiments in which the user equipment uses the 3.5 GHz unlicensed spectrum, the measurements may be broken up into 15 individual and consecutive 10 MHz blocks. In some other embodiments, the measurements may be broken up into one or more individual blocks, which may or may not be consecutive, and may have equal or different bandwidth lengths that may be different that 10 MHz.

Before transmission can occur between the user equipment and a network entity in the SAS, for example standard LTE transmission, preliminary measurements may be taken by the base station, as shown in step 110. The measurements may then be used to determine the desired frequency for the transmission by the user equipment, as shown in step 120. In addition, the radio frequency capabilities of the base station may also be accounted for when determining the desired frequency for transmission by the user equipment. The desired frequency, for example, may be a primary broadcast frequency. In step 130, the base station may send a request to a network entity requesting a grant of at least one desired frequency for transmissions by the user equipment.

In some embodiments, the base station or the user equipment may compare at least two values of the received or taken measurements over a period of time. The user equipment or the base station may then use the compared at least two values in determining the at least one desired frequency for transmission, in step 120. In other words, different measurements over time may be used to determine the desired transmission frequency in the user equipment. In the embodiment illustrated in FIG. 2, the user equipment rather than the base station may receive or take measurements over a period of time, and use the measurements to determine the at least one desired frequency.

Once the user equipment begins to transmit using the desired frequency, measurements may still be taken by either the user equipment or the base station periodically at a rate defined by the user equipment, base station, and/or the operator. In other words, in some embodiments the rate may be autonomously selected by the user equipment based at least on the current level of the network performance. These measurements may be used to verify or reassess whether the current frequency being used, which is the desired frequency requested by the user equipment, remains the best option, or if a more desirable frequency is available. For example, a more desirable frequency may be a frequency band having less interference. The initial or preliminary measurements taken by the base station may not be time sensitive because users are not connected to the cell, which means that there is no risk of users being dropped. The measurements taken during transmission by the user equipment, on the other hand, may be time sensitive and staggered to ensure that no user is dropped.

In certain embodiments, the measurements may be divided between measurements per radio and/or measurements per cell. The measurements shown below are merely provided as an example. Any other measurement may be taken by the base station and/or user equipment. Measurements per radio, for example, may be a maximum bandwidth (maxBW), contiguous cells (isContiguous), number of cells (numCells), and/or a list of cells. The measurements per cell, for example, may be current bandwidth (currentBW), desired bandwidth (desiredBW), current Evolved Absolute Radio Frequency Channel Number (currentEARFCN), per cell bitmap, and whether a given cell is active (isActive).

The maxBW may be the maximum bandwidth of the current radioCard. isContiguous indicates that the current radioCard requires contiguous cells, while isActive indicates if the cell is currently active and on air. CurrentEARFCN indicates the current configured EARFN of one or more cell, while currentBS indicated the current configured of the bandwidth of a cell. DesiredBW may be the desired bandwidth to be allocated for the current cell, and the per cell bit map is the subset of CBRS channels that are candidates for the current cell. In other embodiments, any other measurement may be taken and/or used by the user equipment of the base station.

Figure 5:
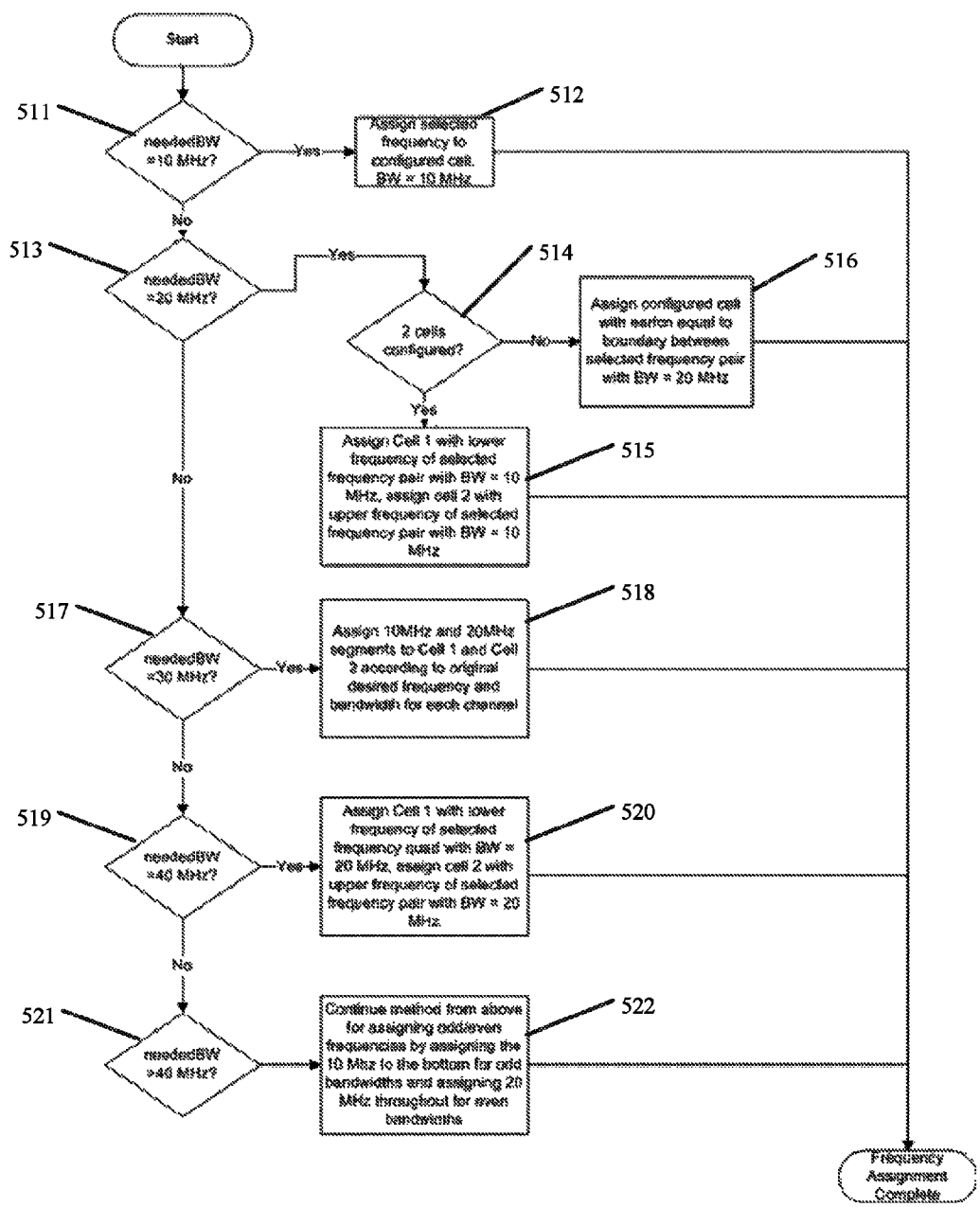
FIG. 5 illustrates a flow diagram according to certain embodiments.
Figure 6:
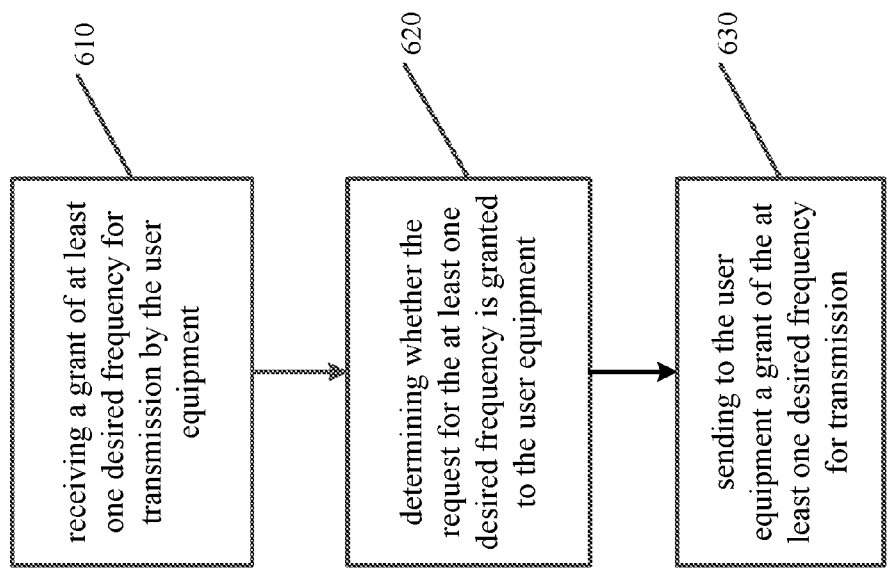
FIG. 6 illustrates a flow chart according to certain embodiments.

One or more of the above measurements may be inputted into the CFSF at the user equipment or the base station in order to predict the desired frequency of the user equipment or device. Once the desired frequency is determined, the base station may send a request to the network entity, which may be serving the unlicensed access system, as shown in step 130. In some embodiments, as shown in FIGS. 5 and 6, the network entity may respond to the request by sending the user equipment a grant of the at least one desired frequency. The user equipment can receive the grant, and transmit data using the desired frequency band. In certain embodiments, the base station operating in a shared spectrum environment may not communicate, or may not even be permitted to communicate, with the end user devices until the optimal frequencies have been determined and granted by the spectrum access system. In other words, some predictions of future radio channel conditions may not leverage measurements of the user equipment.

FIG. 2 illustrates a flow diagram according to certain embodiments. In particular, FIG. 2 illustrates an embodiment of a user equipment, such as a user equipment device (UED). While FIG. 1 illustrates taking of initial measurements, and determining based on the measurements and the frequency capabilities of the base station the desired frequency by the user equipment, FIG. 2 may illustrate subsequent measurements taken by the user equipment after the initiated desired frequency has already been determined by using the measurements taken by the base station.

In step 210, the user equipment, may take measurements of a spectrum of an environment surrounding the user equipment. In step 220, the user equipment may determine based on the measurements and the radio frequency capabilities of the user equipment. The UE may then send a request to the base station requesting a grant of the at least one desired frequency for transmission by the user equipment, as shown in step 230. The request is forwarded to a network entity in the SAS through the base station. As discussed above, the UE may take measurements periodically to ensure that the desired frequency is based on accurate measurements of the current surrounding environment of the UE.

FIG. 3 illustrates a flow diagram according to certain embodiments. In particular, FIG. 3 illustrates that the radio frequency capabilities of the base station or the user equipment may be between 10 MHz to 150 MHz. Depending on the capabilities of the user equipment, the user equipment may need a number of consecutive 10 MHz blocks (n). FIG. 3 illustrates an embodiment of the user equipment or the base station determining the number of consecutive 10 MHz blocks the user equipment may use for transmission. For example, in step 310, if the user equipment has a configured bandwidth of 10 MHz, it may only use a single consecutive 10 MHz block, meaning that n would equal 1. In steps 320, 330, 340, and 350, on the other hand, the user equipment may be configured for a bandwidth of 20 MHz, 30 MHz, 40 MHz, and greater than 40 MHz, respectively. Steps 320, 330, 340, and 350, therefore, may have an n equal to 2, 3, 4, and greater than 4.

Figure 4:
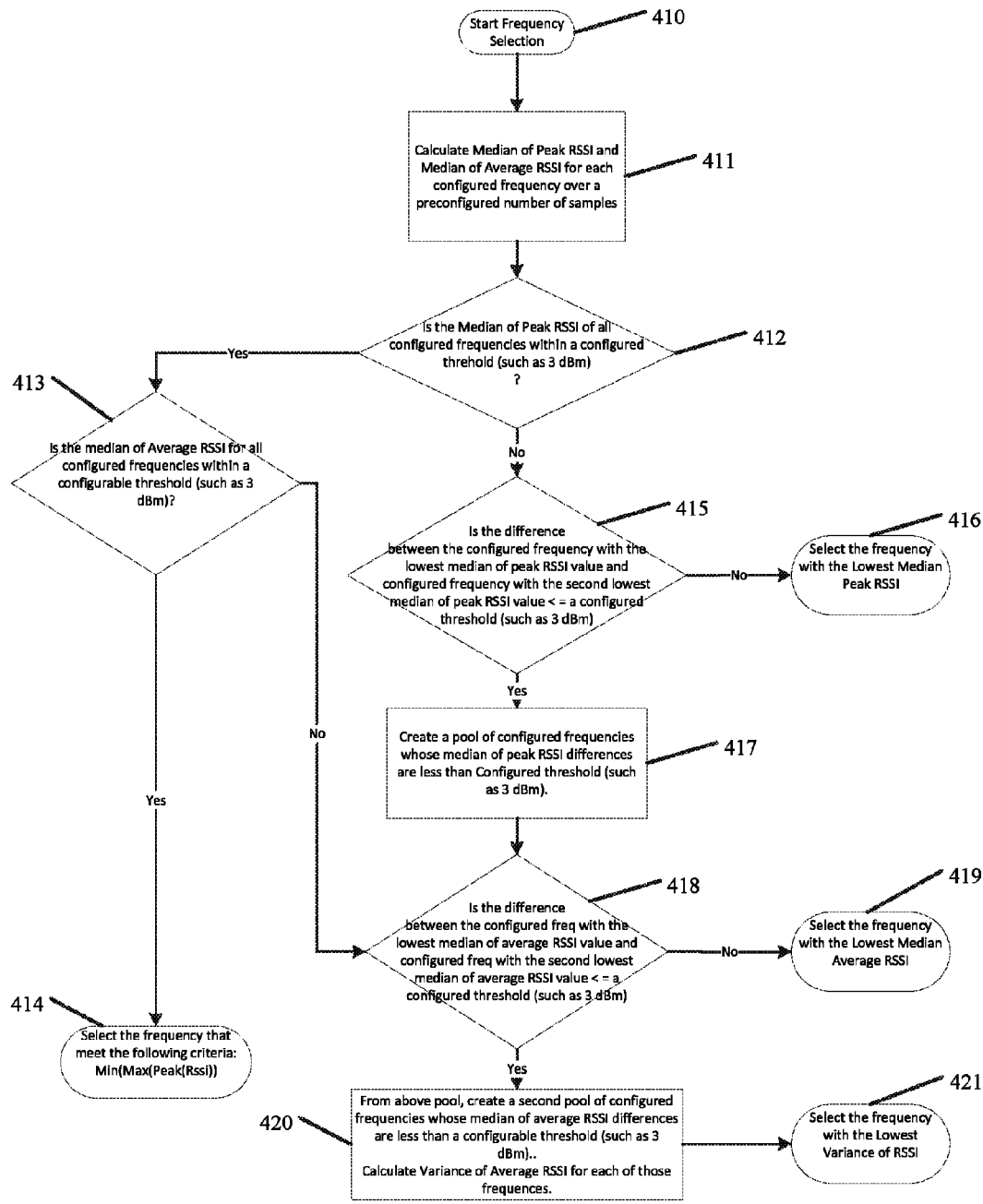
FIG. 4 illustrates a flow diagram according to certain embodiments.

FIG. 4 illustrates a flow diagram according to certain embodiments. In particular, FIG. 4 illustrates a user equipment or base station having a configured bandwidth or having radio frequency capabilities of 10 MHz. In such an embodiment, the user equipment or the base station may choose the best available 10 MHz frequency for user equipment transmission within the 3.5 GHz band. In some embodiments, the process illustrated in FIG. 4 may be carried out by the CFSF, while in other embodiments any other function contained within the user equipment or the base station may determine the desired frequency.

In step 410, the user equipment or base station may seek to select the optimal or desired transmission frequency in an unlicensed shared access system, for example a 3.5 GHz band. A network entity with the SAS, or outside the SAS, may report that not all of the 150 MHz is available for use by the particular user equipment. Unavailable frequencies may then be removed from the CFSF's candidate frequencies. In step 411, the median of the peak RSSI measurements and median of average RSSI measurements are computed over a preconfigured number of samples for all available frequencies that are still under consideration. The preconfigured number of samples may depend on the frequency band the user equipment or base station seeks to select.

In certain embodiments, as shown in step 412, the user equipment or base station may determine whether the median peak RSSI of all configured frequencies are within a predetermined or preconfigured threshold. The threshold, for example, may be a 3 decibel-milliwatts (dBm) offset used for LTE technology. If so, as shown in step 413, it may be determined whether the median average RSSI of all configured frequencies may also be within a configurable threshold, such as a 3 dBm threshold. If both the median of peak RSSI and the average RSSI for all configurable frequencies are within a configurable threshold, the user equipment or the base station may select the minimum of the maximum peak RSSI (Min(Max(Peak(RSSI)))), as shown in step 414. If not, then the user equipment or the base station may move to step 418.

When the median peak RSSI of all the configured frequencies may not be within a configured threshold, the user equipment or the base station may move to step 415. In step 415, the difference between the configured frequency with the lowest median of peak RSSI value and the configured frequency with the second lowest median peak RSSI value are compared. If the difference between the values of the lowest and the second lowest median peak RSSI values is greater than a configured threshold, the frequency with the lowest median peak RSSI may be selected, as shown in step 416. However, if the difference between the values of the lowest and the second lowest median peak RSSI values is less than or equal to a configured threshold, a pool or list may be aggregated of configured frequencies whose median of peak RSSI difference is less than a configured threshold.

In step 418, the pool or list aggregated in step 417 may be assessed. In particular, it may be determined whether the difference between the configured frequencies of the lowest and second lowest median of average RSSI values is less than or equal to a predetermined threshold. If not, then the user equipment of the base station may select the frequency of the lowest median average RSSI, as shown in step 419. If the difference is smaller than or equal to a configured threshold, then a second pool or list may be aggregated for configured frequencies whose median of average RSSI difference is less than a configurable threshold, as shown in step 420.

The variance of the average RSSI for each of the frequencies in the pool or list created in step 420 may then be determined. In step 421, the frequency with the lowest variance of RSSI is selected by the user equipment or the base station. The frequency blocks selected by the CFSF of the user equipment or the base station in steps 414, 416, 419, and 421 may be said to have the optimal or desired frequency.

Certain embodiments may help to predict which combination of channels may provide an optimal future radio channel performance based on pre-transmission measurements. The process illustrated in FIG. 4 may consider available channels at a current location of the base station that are provided by the SAS to determine which channel to use. In some embodiments, available channels may be weighed based on the probability of suspension. For example, predicted future radio frequency channel performance may be based on the likelihood of being told by the SAS to seize transmission or to request at least one new frequency. The above probability may be determined based on the location of the base station or user equipment, the frequency range of the current channel type, for example priority access license or general access license, whether the user equipment and/or base station is a member of a priority protection area, and/or historic suspension or relocation behavior of the channel.

FIG. 5 illustrates a flow diagram according to certain embodiments. FIG. 4 illustrates determining based on measurements and radio frequency capabilities of the user equipment at least one desired frequency for transmissions by the user equipment. A request including the desired frequency may then send to a network entity in the SAS. FIG. 5 illustrates how the SAS assigns or grants the desired frequency requested by the user equipment or device. In step 511, the network entity in the SAS may receive a request for a frequency grant of 10 MHz. In step 512, the network entity may assign the desired frequency to a configured cell, within which the user equipment is located. For example, the user equipment or device and the base station may be located in the configured first or second cell.

In step 513, the network entity in the SAS may receive a request for a frequency grant of 20 MHz. The network entity may then decide whether to configure two cells, granting each a single 10 MHz band, or whether to configure a single cell with a 20 MHz band, as shown in step 514. In step 515, the network entity may assign a first cell having a lower frequency of the selected frequency pair 10 MHz, while assigning a second cell with a higher frequency of the selected frequency pair 10 MHz. On the other hand, in step 516, the network entity may assign a configured cell having an EARFCN equal to the boundary between the selected frequency pair 20 MHz.

In step 517, the network entity in the SAS may receive a request for a frequency grant of 30 MHz. The network entity may then assign 10 MHz to cell 1 and 20 MHz to cell 2, according to the desired frequency and bandwidth of each channel, as shown in step 518. In step 519, the network entity in the SAS may receive a request for a frequency grant of 40 MHz. In step 520, the network entity may assign a first cell having a lower frequency of the selected frequency quad 20 MHz, while assigning a second cell with a higher frequency of the selected frequency quad 20 MHz. In step 521, the network entity in the SAS may receive a request for a frequency grant of 40 MHz or greater, as illustrated in FIG. 6. The network entity may continue to assign odd and/or even frequencies by assigning an additional 10 MHz to a cell for odd bandwidths, and assigning 20 MHz to all cells for even bandwidths.

FIG. 6 illustrates a flow chart according to certain embodiments. Specifically, FIG. 6 illustrates an embodiment of the network entity in the SAS. In step 610, a network entity can receive from a base station or a user equipment, through the base station, a request for a grant of at least one desired frequency for transmission by the user equipment. The network entity may then determine whether the request for the at least one desired frequency is granted to the user equipment, as shown in step 620 and FIG. 5. In step 630, the network entity may then send to the user equipment the grant of the at least one desired frequency for transmission.

Figure 7:
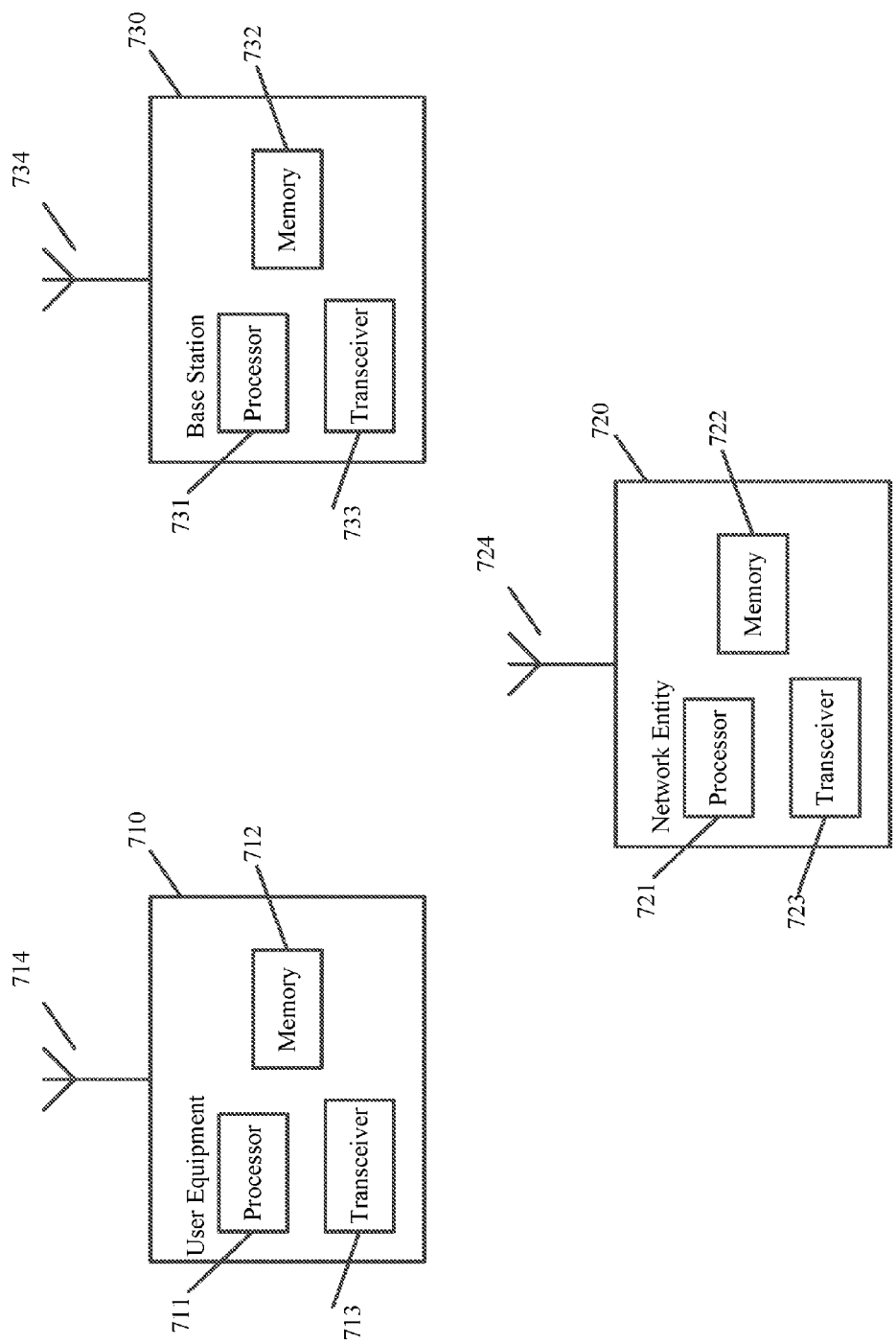
FIG. 7 illustrates a system according to certain embodiments.

FIG. 7 illustrates a system according to certain embodiments. It should be understood that each signal or block in FIGS. 1, 2, 3, 4, 5, and 6 may be implemented by various means or their combinations, such as hardware, software, firmware, one or more processors and/or circuitry. In one embodiment, a system may include several devices, such as, for example, a base station 730, a network entity 720, a UE 710. The system may include more than one UE 710, more than one base station 730, and more than one network entity 720. Network entity 730 may be located in or serve the SAS. The network entity may be a server, a host, a base station, a network node, an access node, or any of the other access or network node discussed herein. 720, on the other, may be a CBSD, a server, a host, a base station, a network node, an access node, or any of the other access or network node discussed herein.

Each of these devices may include at least one processor or control unit or module, respectively indicated as 711, 721, and 731. At least one memory may be provided in each device, and indicated as 712, 722, and 732 respectively. The memory may include computer program instructions or computer code contained therein. One or more transceiver 713, 723, and 733 may be provided, and each device may also include an antenna, respectively illustrated as 714, 724, and 734. Although only one antenna each is shown, many antennas and multiple antenna elements may be provided to each of the devices. Other configurations of these devices, for example, may be provided. For example, network entity 720, UE 710, and/or base station 730 may be additionally configured for wired communication, in addition to wireless communication, and in such a case antennas 714, 724, and 734 may illustrate any form of communication hardware, without being limited to merely an antenna.

Transceivers 713, 723, and 733 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server. In some embodiments, a single receiver or radio may be used by user equipment 710 or base station 730 to either receive measurements or transmit measurements.

A user device or UE 710 may be a user equipment device, a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. In other embodiments, the user equipment may be replaced with a machine communication device that does not require any human interaction, such as a sensor or a meter.

In some embodiments, an apparatus, such as a network entity, may include means for carrying out embodiments described above in relation to FIGS. 1, 2, 3, 4, 5, and 6. In certain embodiments, at least one memory including computer program code can be configured to, with the at least one processor, cause the apparatus at least to perform any of the processes described herein.

According to certain embodiments, an apparatus 730 may include at least one memory 732 including computer program code, and at least one processor 731. The at least one memory 732 and the computer program code may be configured, with the at least one processor 731, to cause the apparatus 730 at least to take measurements by a base station of a spectrum of an environment surrounding the user equipment. The at least one memory 732 and the computer program code may also be configured, with the at least one processor 731, to also cause the apparatus 730 at least to determine based on the measurements and radio frequency capabilities of the base station at least one desired frequency for transmission by the user equipment. In addition, the at least one memory 732 and the computer program code may be configured, with the at least one processor 731, to cause the apparatus 730 at least to send a request from the base station to a network entity requesting a grant of the at least one desired frequency for transmission by the user equipment.

According to certain embodiments, an apparatus 710 may include at least one memory 712 including computer program code, and at least one processor 711. The at least one memory 712 and the computer program code may be configured, with the at least one processor 711, to cause the apparatus 710 at least to take measurements by a user equipment of a spectrum of an environment surrounding the user equipment. The at least one memory 712 and the computer program code may also be configured, with the at least one processor 711, to also cause the apparatus 710 at least to determine based on the measurements and radio frequency capabilities of the user equipment at least one desired frequency for transmission by the user equipment. In addition, the at least one memory 712 and the computer program code may be configured, with the at least one processor 711, to cause the apparatus 710 at least to send a request from the user equipment to the base station requesting a grant of the at least one desired frequency for transmission by the user equipment. The request is forwarded to a network entity through the base station.

According to certain embodiments, an apparatus 720 may include at least one memory 722 including computer program code, and at least one processor 721. The at least one memory 722 and the computer program code may be configured, with the at least one processor 721, to cause the apparatus 720 at least to receive from a user equipment or a base station at a network entity a request for a grant of at least one desired frequency for transmission by the user equipment. The at least one memory 722 and the computer program code may also be configured, with the at least one processor 721, to also cause the apparatus 720 at least to determine whether the request for the at least one desired frequency is granted to the user equipment. In addition, the at least one memory 722 and the computer program code may be configured, with the at least one processor 721, to cause the apparatus 720 at least to send to the base station or the user equipment the grant of the at least one desired frequency for transmission.

Processors 711, 721, and 731 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 712, 722, and 732 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 720, a base station 730, or UE 710, to perform any of the processes described above (see, for example, FIGS. 1, 2, 3, 4, 5, and 6). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 7 illustrates a system including a network entity 720, a base station 730, and UE 710, certain embodiments may be applicable to other configurations, and configurations involving additional elements, as illustrated and discussed herein. For example, multiple user equipment devices and multiple base stations or network entities may be present, or other nodes providing similar functionality, such as nodes that combine the functionality of a user equipment and an network entity, such as a relay node.

The UE 710 may likewise be provided with a variety of configurations for communication with other entities or networks other than communication network entity 720 or base station 730. For example, the UE 710 may be configured for device-to-device, machine-to-machine, or vehicle-to-vehicle communication.

As discussed above, certain embodiments allow for an optimal selection of frequency resulting in maximum throughput for transmissions in an unlicensed shared access system, such as in a 3.5 GHz unlicensed spectrum state. The above embodiments therefore provide significant improvements to the functioning of a network and/or to the functioning of the nodes within the network, or the user equipment communicating with the network.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. While some embodiments may be directed to an LTE environment, other embodiments can be directed to other 3GPP technology, such as LTE advanced, 5G, or NR technology.

Partial Glossary:
CBSD Citizens Band Service Device
CBRS Citizens Band Radio Service
SAS Spectrum Access System
RSSI Received Signal Strength Indicator
CFSF Candidate Frequency Selection Function

We claim:

1. A method comprising:
taking measurements by a base station of a spectrum of an environment surrounding a user equipment;
determining based on the measurements and radio frequency capabilities of the base station at least one desired frequency for transmission by the user equipment; and
sending a request from the base station to a network entity requesting a grant of the at least one desired frequency for transmission by the user equipment,
wherein the at least one desired frequency for transmission is selected from a predefined unlicensed band between 3500 megahertz and 3750 megahertz, and
wherein at least the measurements or the grant are broken up into 10 megahertz blocks of the predefined unlicensed band.

2. The method according to claim 1, wherein a single radio may be used for the taking of the measurements and the sending of the request.

3. The method according to claim 1, further comprising:
comparing at least two values of the received measurements over a period of time; and
using the compared at least two values in the determining of the at least one desired frequency for transmission.

4. The method according to claim 1, wherein the at least one desired frequency for transmission maximizes a throughput of the transmission.

5. The method according to claim 1, wherein the measurements are reported by a received signal strength indicator.

6. The method according to claim 5, wherein the base station uses at least a peak of the received signal strength indication, a median of an average of the received signal strength indication, a variance of the average of the received signal strength indication, or a lowest of the peak of the received signal strength indication in the determining of the desired frequency for transmission.

7. The method according to claim 1, wherein the base station comprises a candidate frequency selection function to determine the at least one desired frequency.

8. The method according to claim 1, wherein the base station is a citizens band service device.

9. The method according to claim 1, wherein the network entity is included in a spectrum access system.

10. The method according to claim 1, wherein the measurements are taken periodically at a rate defined by a network operator.

11. An apparatus comprising:
at least one memory comprising computer program code;
at least one processor;
wherein the at least one memory and the computer program code are configured, with the at least one processor, to cause the apparatus at least to:
take measurements by a base station of a spectrum of an environment surrounding a user equipment;
determine based on the measurements and radio frequency capabilities of the base station at least one desired frequency for transmission by the user equipment; and
send a request from the base station to a network entity requesting a grant of the at least one desired frequency for transmission by the user equipment,
wherein the at least one desired frequency for transmission is selected from a predefined unlicensed band between 3500 megahertz and 3750 megahertz, and
wherein at least the measurements or the grant are broken up into 10 megahertz blocks of the predefined unlicensed band.

12. The apparatus according to claim 11, wherein the at least one memory and the computer program code are configured, with the at least one processor, to cause the apparatus at least to:
compare at least two values of the received measurements over a period of time; and
use the compared at least two values in the determining of the at least one desired frequency for transmission.

13. The apparatus according to claim 12, wherein the measurements are report by a received signal strength indicator.

14. The apparatus according to claim 13, wherein the base station uses at least a peak of the received signal strength indication, a median of an average of the received signal strength indication, a variance of the average of the received signal strength indication, or a lowest of the peak of the received signal strength indication in the determining of the desired frequency for transmission.

15. The apparatus according to claim 12, wherein the base station comprises a candidate frequency selection function to determine the at least one desired frequency.

16. The apparatus according to claim 12, wherein the base station is a citizens band service device.

17. The apparatus according to claim 12, wherein the network entity is included in a spectrum access system.

18. The apparatus according to claim 12, wherein the measurements are taken periodically at a rate defined by a network operator.

19. A method comprising:
  receiving from a user equipment or a base station at a network entity a request for a grant of at least one desired frequency for transmission by the user equipment;
  determining whether the request for the at least one desired frequency is granted to the user equipment; and
  sending to the base station or the user equipment the grant of the at least one desired frequency for transmission,
  wherein the at least one desired frequency for transmission is selected from a predefined unlicensed band between 3500 megahertz and 3750 megahertz, and
  wherein at least the measurements or the grant are broken up into 10 megahertz blocks of the predefined unlicensed band.

20. The method according to claim 19, wherein the network entity is included in a spectrum access system.

21. The method according to claim 19, further comprising:
  assigning the at least one desired frequency for transmission by the user equipment to one or more cells.

22. The apparatus according to claim 19, wherein the base station uses at least a peak of a received signal strength indication, a median of an average of the received signal strength indication, a variance of the average of the received signal strength indication, or a lowest of the peak of the received signal strength indication in the determining of the desired frequency for transmission.

23. An apparatus comprising:
  at least one memory comprising computer program code;
  at least one processor;
  wherein the at least one memory and the computer program code are configured, with the at least one processor, to cause the apparatus at least to:
  receive from a user equipment or a base station at a network entity a request for a grant of at least one desired frequency for transmission by the user equipment;
  determine whether the request for the at least one desired frequency is granted to the user equipment; and
  send to the user equipment or the base station the grant of the at least one desired frequency for transmission,
  wherein the at least one desired frequency for transmission is selected from a predefined unlicensed band between 3500 megahertz and 3750 megahertz, and
  wherein at least the measurements or the grant are broken up into 10 megahertz blocks of the predefined unlicensed band.

24. The apparatus according to claim 23, wherein the network entity is included in a spectrum access system.

25. The apparatus according to claim 23, wherein the at least one memory and the computer program code are configured, with the at least one processor, to cause the apparatus at least to assign the at least one desired frequency for transmission by the user equipment to one or more cells.

26. The apparatus according to claim 23, wherein the base station uses at least a peak of a received signal strength indication, a median of an average of the received signal strength indication, a variance of the average of the received signal strength indication, or a lowest of the peak of the received signal strength indication in the determining of the desired frequency for transmission.

\* \* \* \* \*